United States Patent Office 3,036,982
Patented May 29, 1962

3,036,982
COMPOSITION COMPRISING POLYETHYLENE AND QUINHYDRONE DIMERIDE, PROCESS FOR CURING SAME AND CURED PRODUCT
Allen C. Bluestein and Richard F. Grossman, Marion, Ind., assignors to Anaconda Wire and Cable Company, a corporation of Delaware
No Drawing. Filed June 26, 1959, Ser. No. 823,007
16 Claims. (Cl. 260—41)

This invention relates to a process for cross-linking polyethylene in which the polymer chains are induced to undergo bond formation with themselves and with carbon black particles dispersed throughout the polymer. The invention provides an improved process for cross-linking polyethylene and is based on a discovery that quinhydrone dimerides, when incorporated in a polyethylene system, in conjunction with an alkaline carbon black, are capable of undergoing disproportionation into a stable free radical with the generation of a sufficient number of free radicals within the system to induce cross-linking of the polymer chains. The invention further provides a polyethylene composition adapted to be structurally modified by cross-linking upon heating, and also contemplates the provision of a cross-linked polyethylene which is particularly suitable for use in the insulation of high-voltage electric power cables.

Polyethylene is a rigid, waxy, translucent, synthetic resin having excellent dielectric properties, ozone resistance, moisture resistance, and chemical stability. It has been extensively used in recent years for insulating high-frequency conductors which normally carry only small currents. Although polyethylene possesses excellent chemical and electrical properties as an insulating material for high-voltage power cables which carry relatively large currents, its use for this purpose has been limited due to its extremely high coefficient of thermal expansion and to its tendency to deform under stress at elevated temperatures, both of which devolve, in part, from the relatively low softening point of polyethylene. For example, the softening point of polyethylene is about 105° C., while the volumetric expansion of polyethylene is approximately 4 percent when its temperature increases from 20° C. to 40° C. An operating range in temperatures of this magnitude is not at all unusual in high-voltage power cables.

The softening point of polyethylene undergoes a marked increase when polyethylene chains are cross-linked to form a three-dimensional matrix similar to that of thermoset polymers. Structural modification of polyethylene by cross-linking or "curing" (the two terms being synonymous and interchangeably used) decreases both the thermoplasticity and the solubility of the polymer but increases its resistance to deformation under stress at elevated temperatures. X-ray diffraction studies of cross-linked polyethylene indicate that the cross-linked polymer undergoes a decrease in the degree of crystallinity, primarily because the three-dimensional lattice of the cross-linked polymer is incapable of forming a lattice plane. Although the chemical properties of cross-linked polyethylene do not appear to vary significantly from those of uncured polyethylene, there is some evidence that the resistance to corona discharge of the cross-linked polymer is somewhat higher than that of the uncured material.

Various processes have been developed to alter the molecular structure of polyethylene by cross-linking. In general, these processes are based on generating a free radical in the polymer system, either by pyrochemically dissociating a thermally unstable compound into one or more free radicals which initiate radical formation in the polymer chains, or by subjecting the polymer system to high-energy radiation to cause homolytic scission of several of the carbon-hydrogen bonds in the polymer, cross-linking taking place in both instances through covalent bond formation between polymer radicals. By way of illustration, when a homopolymer of ethylene is blended with a small amount of an organic peroxide, such as benzoyl peroxide or di-(α-cumyl) peroxide, and then heated to the dissociation temperature of the peroxide, the peroxide undergoes homolytic scission into two peroxy radicals, which, in turn, may further rearrange into more active radicals. Collision of these radicals with the polyethylene chains results in the generation of polymer radicals, several of which combine to form covalent bonds and thereby cross-link the polymer chains.

In theory, every compound capable of being pyrochemically dissociated into free radicals could initiate and generate radical formation in polyethylene and thus induce cross-linking of the polymer chains. As a practical matter, however, there are very few classes of compounds which actually aid in cross-linking polyethylene. For example, many organic di- and polysulfides thermally dissociate to form the corresponding thiyl radicals or diradicals, but these compounds have been found to be virtually ineffective as cross-linking agents for polyethylene, perhaps due to the ease with which they oxidize to sulfoxy derivatives and are thereby precluded from initiating radical formation in the polymer chains. Similarly, many peroxides and azo compounds are inefficient or ineffective as cross-linking agents, largely because the free radicals they form upon dissociation are either too unstable or preferentially enter into other radical-consuming reactions before initiating radical formation in the polymer chains. Consequently, whether or not a particular compound functions as a cross-linking agent for polyethylene must be established by empirical observations.

Using a quinhydrone dimeride capable of disproportionating into a free radical in the presence of base, we have found that by incorporating a small amount of the quinhydrone dimeride in a blended mixture of polyethylene and an alkaline carbon black having a pH (when suspended in water) in the range from about 8 to about 10, or by forming the quinhydrone dimeride in situ in this mixture, it is possible to generate free radicals within the mixture and induce cross-linking of the polymer chains merely upon heating the mixture to a temperature above that at which the quinhydrone dimeride undergoes disproportionation into a free radical. The cross-linked polyethylene composition does not melt below 300° C. and possesses outstanding thermal stability at lower temperatures. The cross-linked polyethylene compositions of the invention are characterized by excellent chemical and electrical properties and so are particularly useful in insulating high-voltage electric power cables, though their utility is not limited to this field.

Based on these discoveries, the invention provides an improved process for cross-linking polyethylene which comprises uniformly blending a normally solid polymer of ethylene with a minor amount of a quinhydrone dimeride and an alkaline carbon black having a pH, when suspended as a sludge in water, in the range from about 8 to about 10, and heating the resultant mixture to a temperature above that at which the quinhydrone dimeride undergoes disproportionation into a free radical, thereby generating free radicals within the mixture and inducing cross-linking of the polymer chains.

Any quinhydrone dimeride, which substances in general are capable of disproportionating into a free radical in the presence of base, or any compounds capable of forming such a quinhydrone dimeride in situ, may be selected for inclusion as a cross-linking agent in the polyethylene mixture in accordance with the invention. A quinhydrone dimeride is defined as the 1:1 dimer of a 1,4-quinone (such as p-benzoquinone, substituted p-benzoquinones, 1,4-naphthaquinones or anthraquinones) and a p-disubstituted aromatic compound having at least one acidic hydrogen (as in hydroxy, amino or oximino groups) in each of the para substituents. The generic compound from which this class of compounds takes its name is "quinhydrone," which is the dimeride of p-benzoquinone and hydroquinone. All quinhydrone dimerides disproportionate into free radicals in the presence of a base and, consequently, any of them, or any compounds capable of forming a quinhydrone dimeride in situ in the reaction mixture, may be used to cross-link polyethylene in accordance with the invention. The quinhydrone dimerides of p-benzoquinone with hydroquinone, p-phenylenediamine, or p-benzoquinonedioxime, as well as the dimerides of 2,3,5,6-tetrachloro-p-benzoquinone with these p-disubstituted aromatic compounds, have been found to be especially effective cross-linking agents for polyethylene.

These latter quinhydrone dimerides undergo disproportionation to the corresponding semiquinone free radicals in the presence of a base. For example, the quinhydrone dimeride of p-benzoquinone and hydroquinone, which is designated merely as "quinhydrone," undergoes a reversible disproportionation in alkaline solution to form two semiquinone free radicals, as indicated by the following equation:

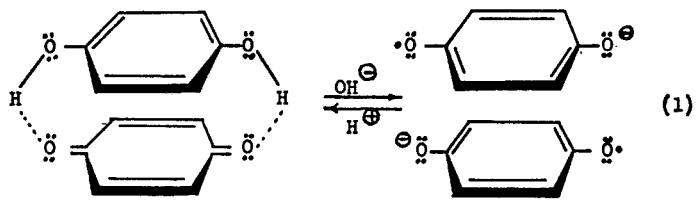

(1)

In the case of the quinhydrone dimeride of 2,3,5,6-tetrachloro-p-benzoquinone and p-benzoquinonedioxime, which may be conveniently formed in situ in the polyethylene mixture, the disproportionation into free radicals in alkaline solution is believed to proceed via the formation of a 2,3,5,6-tetrachlorosemiquinone free radical in accordance with the following equation:

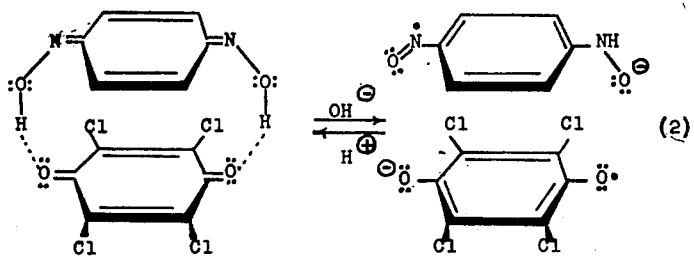

(2)

or, quite possibly, through the formation of the 2,3,5,6-tetrachlorohydroquinone diradical in accordance with the following equation:

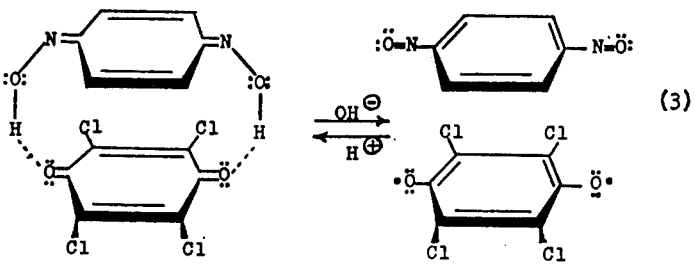

(3)

The quinhydrone dimeride has been found to disproportionate into a free radical only in the presence of a base and therefore will function effectively as a cross-linking agent for polyethylene only when it is used in conjunction with an alkaline carbon black in the polyethylene composition. These alkaline carbon blacks, of which the furnace combustion blacks or the furnace thermal blacks are but two examples, should have a pH in the range from about 8 to about 10 when they are suspended or dispersed in water in the form of a sludge. In general, the higher the pH of the alkaline carbon black, the more rapid the disproportionation of the quinhydrone dimeride and the more effective the degree of cross-linking. The alkaline carbon blacks appear to participate in some way in the cross-linking reaction, apparently through the formation of radicals on their surfaces since X-ray diffraction studies of the cross-linked composition indicate the existence of weak bonds between the polymer and the carbon black particles.

Theoretically, the concentrations of both the quinhydrone dimeride and of the alkaline carbon black initially added to the polyethylene are dependent upon the extent to which the polyethylene is to be cross-linked, which, in turn, is dependent upon the rate at which polymer radicals are generated in the system. The rate at which polymer radicals are formed is, of course, a function of several variables, including the kinetics of disproportionation of the quinhydrone dimeride into a free radical as well as concentration of the dimeride and the particle size and alkalinity of the carbon black. Generally, the more complete the degree of cross-linking, the greater will be the amount of quinhydrone dimeride, and consequently the amount of alkaline carbon black, required in the polyethylene mixture. In practice, a large excess of quinhydrone dimeride preferably is used to cross-link the polyethylene system. This excess may be from twofold to as high as a hundredfold over the amount theoretically required to initiate the formation and subsequent generation of polymer radicals. Consequently, these quinhydrone dimerides may be used over a very wide range of concentrations. In most cases, we prefer to use the quinhydrone dimeride in an amount in the range from about 1 to about 10 percent by weight, while using the alkaline carbon black at concentrations ranging from about 10 to about 40 percent by weight, all percentages being based on the weight of the polyethylene contained in the blended mixture.

In many instances, the flexibility of the cured product will not be as great as that of polyethylene since crosslinking of the polymer chains is invariably accompanied by a decrease in the elasticity and tensile strength of the product. Increased flexibility of the product can be obtained, however, by incorporating a compatible plasticizer for the polyethylene in the blended mixture prior to curing by disproportionating the quinhydrone dimeride into a free radical. In such instances, the plasticizer may be used over a very wide range of concentrations, depending upon the desired flexibility, but the ratio of the plasticizer to the alkaline carbon black in the blended mixture should be between 0.5:1 to 1.75:1 to avoid incomplete cures. Although a large number of plasticizers may be added to the mixture to improve the ultimate flexibility of the cured product, we have obtained particularly satisfactory results by using various synthetic elastomers capable of plasticizing polyethylene. These plasticizers, of which the elastomeric copolymers of butadiene and styrene are typical, may be used in concentrations ranging from 10 to 40 percent by weight of the polyethylene contained in the mixture.

To prepare the cross-linked polyethylene composition of the invention, a normally solid polymer of ethylene, preferably having a molecular weight in excess of 10,000, is intimately blended together with the quinhydrone dimeride and the alkaline carbon black, using a roll mill or any other convenient mixing equipment. The precise order of mixing is immaterial, but care must be taken during the milling operation to avoid overheating and prematurely curing the blended mixture.

After thoroughly and intimately mixing the components, the blended mixture may be shaped by any convenient means, such as by molding, extruding, or rolling it into sheets, and is then heated to a temperature above that at which the quinhydrone dimeride undergoes disproportionation into a free radical, thereby generating free radicals within the mixture and inducing the polymer chains to cross-link with themselves and probably with the alkaline carbon black particles. The temperature at which curing occurs is dependent, of course, upon the particular quinhydrone dimeride employed as the cross-linking agent. Most of the quinhydrone dimerides which are used in the process of the invention undergo dissociation into free radicals in the presence of alkaline carbon black over the broad range of temperatures from 80° C. to about 250° C. For example, when the quinhydrone dimeride of p-benzoquinone and a hydroquinone, or the dimeride of 2,3,5,6-tetrachloro-p-benzoquinone and p-benzoquinonedioxime are employed as cross-linking agents, effective cures have been obtained at temperatures ranging from 140° C. to 160° C., or even slightly higher.

Table I summarizes the results obtained in five different tests, in each of which a blended mixture of polyethylene and a quinhydrone dimeride (p-benzoquinone and hydroquinone) containing varying amounts of an alkaline carbon black was heated to a temperature above that at which the dimeride undergoes disproportionation to a free radical. In each of these tests a commercial polyethylene (M.W. ca. 21,000) was intimately blended with quinhydrone and an alkaline carbon black (pH=9.5), the carbon black being omitted in test 5, and the blended mixture then milled until it was homogeneous. After removing the blended mixture from the milling rolls in the form of a sheet, it was heated with steam in a flash vulcanizer to a temperature of 198° C. and a gauge pressure of about 200 pounds per square inch. The stability of the product at a temperature of 121° C. was used as a criterion of successful cure.

TABLE I

*Physical Properties of Cross-Linked Polyethylene*

| Composition (Parts by Weight) | Test Number | | | | |
|---|---|---|---|---|---|
| | 1 | 2 | 3 | 4 | 5 |
| Polyethylene | 100 | 100 | 100 | 100 | 100 |
| Carbon black (pH=9.5) | 80 | 40 | 20 | 20 | ----- |
| Quinhydrone | 10 | 10 | 10 | 3 | 10 |
| Physical Properties: | | | | | |
| Cure | Yes | Yes | Yes | Yes | No |
| Porosity | Yes | Yes | Yes | Yes | No |
| Brittleness | Yes | Yes | Yes | Yes | No |
| Elongation (Percent) | 0 | 20 | 50 | 50 | 75 |

Analysis of the test results summarized in Table I demonstrates that the disproportionation of a quinhydrone dimeride functions as an effective cross-linking agent for polyethylene only in the presence of an alkaline carbon black, primarily because the semiquinone free radical formed upon disproportionation of the dimeride is unstable in the absence of an alkaline medium. In the presence of a base, such as an alkaline carbon black, the disproportionation of a quinhydrone dimeride within a polyethylene system generates free radicals in the mixture and induces cross-linking of the polymer chains.

Increased flexibility of the product may be obtained by incorporating a compatible plasticizer for the polyethylene in the blended mixture prior to curing by disproportionating the quinhydrone dimeride into a free radical. In addition, small amounts of various fillers or pigments, such as lead oxide or zinc oxide, may also be added to the blended mixture in conjunction with these plasticizers. Table II sets forth nine different examples of compositions which were used to prepare flexible cross-linked polyethylenes in accordance with the method of the invention. In each of these tests, the quinhydrone dimeride was formed in situ by adding 2,3,5,6-tetrachloro-p-benzoquinone and p-benzoquinonedioxine to the mixture. As before, each mixture was thoroughly blended using an elastomeric copolymer of butadiene and styrene or a butyl rubber to plasticize the polyethylene and the blended mixture milled until it became homogeneous. The blended mixture was then removed from the milling rolls in the form of a sheet and heated in a flash vulcanizer to a temperature of 198° C. at a gauge pressure of about 200 pounds per square inch, successful cures being obtained in each case.

TABLE II

*Preparation of Cross-Linked Polyethylene Elastomer*

| Composition (Parts by Weight) | Test Number | | | | | | | | |
|---|---|---|---|---|---|---|---|---|---|
| | 6 | 7 | 8 | 9 | 10 | 11 | 12 | 13 | 14 |
| Polyethylene | 100 | 100 | 100 | 100 | 100 | 100 | 100 | 100 | 100 |
| Butadiene-Styrene Copolymer | ----- | ----- | 35 | ----- | ----- | ----- | ----- | ----- | ----- |
| Do | ----- | ----- | ----- | 50 | ----- | 20 | 20 | 40 | 20 | 20 |
| Butyl rubber | ----- | 5 | ----- | ----- | ----- | ----- | ----- | ----- | ----- |
| Carbon black (pH=9.5) | ----- | ----- | 20 | 40 | 20 | ----- | ----- | ----- | ----- |
| Carbon black (pH=8.5) | 20 | 20 | ----- | ----- | ----- | 20 | 40 | 80 | 80 |
| 2,3,5,6-Tetrachloro-p-benzoquinone [1] | 5 | 5 | 3 | 3 | 0.5 | 2 | 2 | 2 | 2 |
| p-Benzoquinonedioxime | 5 | 5 | 3 | 3 | 0.5 | 2 | 2 | 2 | 2 |
| Zinc oxide | ----- | 5 | ----- | 5 | 5 | 5 | 5 | 5 | 5 |
| Lead oxide | ----- | 5 | ----- | 5 | 10 | 5 | 5 | 5 | 5 |

[1] Forms quinhydrone dimeride in situ.

Table III sets forth the physical and electrical properties of each of the flexible cross-linked polyethylene products prepared from the composition of Table II. As indicated in Table III, the tensile strength and elongation of a number of these cross-linked polyethylene products were tested after the sample was aged for a period of 15 minutes at a temperature of 260° C. and after it had been aged for seven days at a temperature of 121° C. In addition, the specific inductive capacity and dielectric strength were determined for the three samples possessing the greatest flexibility.

hydrone dimeride of a p-benzoquinone and a p-disubstituted aromatic compound having at least one acidic hydrogen in each of the para substituents, and from 10 to 40 percent by weight of an alkaline carbon black having a pH, when suspended in water, in the range from about 8 to about 10, all percentages being based on the weight of the polyethylene in the blended mixture, and heating the resultant mixture to a temperature above that

TABLE III
*Physical and Electrical Properties of Cross-Linked Polyethylene Elastomer*

| Properties | Test Number | | | | | | | | |
|---|---|---|---|---|---|---|---|---|---|
|  | 6 | 7 | 8 | 9 | 10 | 11 | 12 | 13 | 14 |
| Porosity | Yes | Yes | No | No | No | No | No | No | No |
| Elongation (percent) | 90 | 110 | 160 | 60 | 120 | 120 | 120 | 20 | 40 |
| After aging at 260° C. for 15 minutes: | | | | | | | | | |
| (a) Tensile strength (p.s.i.) | 450 | ------ | -------- | -------- | 1,000 | 1,000 | ---------- | ------ | ------ |
| (b) Elongation (percent) | 40 | ------ | -------- | -------- | 30 | 20 | ---------- | ------ | ------ |
| After aging at 121° C. for 7 days: | | | | | | | | | |
| (a) Tensile strength (p.s.i.) | 1,250 | 900 | 1,250 | 1,300 | 1,200 | 1,700 | 1,500 | ------ | ------ |
| (b) Elongation (percent) | 120 | 90 | 40 | 180 | 50 | 85 | 10 | ------ | ------ |
| 1,000 Cycle SIC | -------- | ------ | -------- | -------- | 5.3 | 3.4 | 4.0 | ------ | ------ |
| Dielectric Strength (volts/mil) | -------- | ------ | -------- | -------- | 143-149 | 683-783 | 460-550 | ------ | ------ |

In the foregoing examples of the invention, polyethylene was cross-linked by forming free radicals in the polyethylene mixture through the disproportionation of the quinhydrone dimeride of p-benzoquinone and hydroquinone or the dimeride of 2,3,5,6-tetrachloro-p-benzoquinone and p-benzoquinonedioxime in the presence of an alkaline carbon black having a pH (when suspended in water) in the range from 8 to 10. Similar advantages are also attained by using the quinhydrone dimeride of p-benzoquinone and p-phenylenediamine, or the dimeride of 1,4-naphthoquinone and hydroquinone as the cross-linking agent. In general, the method of the invention is applicable to the cross-linking of a polyethylene system containing an alkaline carbon black by disproportionating any quinhydrone dimeride capable of forming a free radical in the presence of base.

We claim:

1. A process for cross-linking polyethylene which comprises uniformly blending a normally solid polymer of ethylene with from 1 to 10 percent by weight of a quinhydrone dimeride of a 1,4-quinone and a p-disubstituted aromatic compound having at least one acidic hydrogen in each of the para substituents, and an alkaline carbon black having a pH, when suspended in water, in the range from about 8 to about 10, the percentage of the quinhydrone dimeride being based on the weight of the polyethylene in the blended mixture, and heating the resultant mixture to a temperature above that at which the quinhydrone dimeride undergoes disproportionation into a free radical, thereby generating free radicals within the mixture and inducing cross-linking of the polymer chains.

2. A process for cross-linking polyethylene which comprises uniformly blending a normally solid polymer of ethylene with from 1 to 10 percent by weight of a quinhydrone dimeride of a 1,4-quinone and a p-disubstituted aromatic compound having at least one acidic hydrogen in each of the para substituents, and from 10 to 40 percent by weight of an alkaline carbon black having a pH, when suspended in water, in the range from about 8 to about 10, all percentages being based on the weight of the polyethylene in the blended mixture, and heating the resultant mixture to a temperature above that at which the quinhydrone dimeride undergoes disproportionation into a free radical, thereby generating free radicals within the mixture and inducing cross-linking of the polymer chains.

3. A process for cross-linking polyethylene which comprises uniformly blending a normally solid polymer of ethylene with from 1 to 10 percent by weight of a quinhydrone dimeride of a p-benzoquinone and a p-disubstituted aromatic compound having at least one acidic hydrogen in each of the para substituents, and from 10 to 40 percent by weight of an alkaline carbon black having a pH, when suspended in water, in the range from about 8 to about 10, all percentages being based on the weight of the polyethylene in the blended mixture, and heating the resultant mixture to a temperature above that at which the quinhydrone dimeride undergoes disproportionation into a semiquinone free radical, thereby generating free radicals within the mixture and inducing cross-linking of the polymer chains.

4. A process for cross-linking polyethylene which comprises uniformly blending a normally solid polymer of ethylene with from 1 to 10 percent by weight of the quinhydrone dimeride of p-benzoquinone and hydroquinone, and from 10 to 40 percent by weight of an alkaline carbon black having a pH, when suspended in water, in the range from about 8 to about 10, all percentages being based on the weight of the polyethylene in the blended mixture, and heating the resultant mixture to a temperature above that at which the quinhydrone dimeride undergoes disproportionation into a semiquinone free radical, thereby generating free radicals within the mixture and inducing cross-linking of the polymer chains.

5. A process for cross-linking polyethylene which comprises uniformly blending a normally solid polymer of ethylene with from 1 to 10 percent by weight of the quinhydrone dimeride of p-benzoquinone and p-phenylenediamine, and from 10 to 40 percent by weight of an alkaline carbon black having a pH, when suspended in water, in the range from about 8 to about 10, all percentages being based on the weight of the polyethylene, and heating the resultant mixture to a temperature above that at which the quinhydrone dimeride undergoes disproportionation into a semiquinone free radical, thereby generating free radicals within the mixture and inducing cross-linking of the polymer chains.

6. A process for cross-linking polyethylene which comprises uniformly blending a normally solid polymer of ethylene with from 1 to 10 percent by weight of the quinhydrone dimeride of 2,3,5,6-tetrachloro-p-benzoquinone and hydroquinone, and from 10 to 40 percent by weight of an alkaline carbon black having a pH, when suspended in water, in the range from about 8 to about 10, and heating the resultant mixture to a temperature above that at which the quinhydrone dimeride undergoes disproportination to a 2,3,5,6-tetrachlorosemiquinone free radical, thereby generating free radicals within the mixture and inducing cross-linking of the polymer chains.

7. A process for cross-linking polyethylene which comprises uniformly blending a normally solid polymer of ethylene with from 1 to 10 percent by weight of the quinhydrone dimeride of 2,3,5,6-tetrachloro-p-benzoquinone and p-phenylenediamine, and from 10 to 40 percent by weight of an alkaline carbon black having a pH, when suspended in water, in the range from about 8 to about 10, and heating the resultant mixture to a temperature above that at which the quinhydrone dimeride undergoes disproportionation to a 2,3,5,6-tetrachlorosemiquinone free radical, thereby generating free radicals within the mixture and inducing cross-linking of the polymer chains.

8. A process for cross-linking polyethylene which comprises uniformly blending a normally solid polymer of ethylene with from 1 to 10 percent by weight of the quinhydrone dimeride of 2,3,5,6-tetrachloro-p-benzoquinone and p-benzoquinonedioxime, and from 10 to 40 percent by weight of an alkaline carbon black having a pH, when suspended in water, in the range from about 8 to about 10, and heating the resultant mixture to a temperature above that at which the quinhydrone dimeride undergoes disproportionation to a 2,3,5,6-tetrachlorosemiquinone free radical, thereby generating free radicals within the mixture and inducing cross-linking of the polymer chains.

9. A process for cross-linking polyethylene which comprises uniformly blending a normally solid polymer of ethylene with from 1 to 10 percent by weight of a quinhydrone dimeride of a 1,4-quinone and a p-disubstituted aromatic compound having at least one acidic hydrogen in each of the para substituents, and alkaline carbon black having a pH, when suspended in water, in the range from about 8 to about 10, the percentage of the quinhydrone dimeride being based on the weight of the polyethylene in the blended mixture, and a compatible plasticizer for the polyethylene, the ratio of the plasticizer to the alkaline carbon black in the mixture being from 0.5:1 to 1.75:1, and heating the resultant mixture to a temperature above that at which the quinhydrone dimeride undergoes disproportionation into a free radical, thereby generating free radicals within the mixture and inducing cross-linking of the polymer chains.

10. A process for cross-linking polyethylene which comprises uniformly blending a normally solid polymer of ethylene with from 1 to 10 percent by weight of a quinhydrone dimeride of a 1,4-quinone and a p-disubstituted aromatic compound having at least one acidic hydrogen in each of the para substituents, from 10 to 40 percent by weight of an alkaline carbon black having a pH, when suspended in water, in the range from about 8 to about 10, and from 10 to 40 percent by weight of an elastomeric copolymer of butadiene and styrene capable of plasticizing the polyethylene, all percentages being based on the weight of the polyethylene in the blended mixture, the ratio of the elastomeric plasticizer to the alkaline carbon black in the mixture being from 0.5:1 to 1.75:1, and heating the resultant mixture to a temperature above that at which the quinhydrone dimeride undergoes disproportionation into a free radical, thereby generating free radicals in the mixture and inducing cross-linking of the polymer chains.

11. A process for cross-linking polyethylene which comprises uniformly blending a normally solid polymer of ethylene with from 1 to 10 percent by weight of the quinhydrone dimeride of 2,3,5,6-tetrachloro-p-benzoquinone and p-benzoquinonedioxime, from 10 to 40 percent by weight of an alkaline carbon black having a pH, when suspended in water, in the range from about 8 to about 10, and from 10 to 40 percent by weight of an elastomeric copolymer of butadiene and styrene capable of plasticizing the polyethylene, all percentages being based on the weight of the polyethylene in the blended mixture, the ratio of the elastomeric copolymer to the alkaline carbon black in the mixture being from 0.5:1 to 1.75:1, and heating the resultant mixture to a temperature above that at which the quinhydrone dimeride undergoes disproportionation into a 2,3,5,6-tetrachlorosemiquinone free radical, thereby generating free radicals within the mixture and inducing cross-linking of the polymer chains.

12. A polyethylene composition adapted to be cross-linked upon heating comprising a normally solid polymer of ethylene uniformly blended with from 1 to 10 percent by weight of a quinhydrone dimeride of a 1,4-quinone and a p-disubstituted aromatic compound having at least one acidic hydrogen in each of the para substituents, and from 10 to 40 percent by weight of an alkaline carbon black having a pH, when suspended in water, in the range from about 8 to about 10, all percentages being based on the weight of the polyethylene in the composition.

13. A polyethylene composition adapted to be cross-linked upon heating comprising a normally solid polymer of ethylene uniformly blended with from 1 to 10 percent by weight of a quinhydrone dimeride of a 1,4-quinone and a p-disubstituted aromatic compound having at least one acidic hydrogen in each of the para substituents, from 10 to 40 percent by weight of an alkaline carbon black having a pH, when suspended in water, in the range from about 8 to about 10, and from 10 to 40 percent by weight of a compatible plasticizer for the polyethylene, all percentages being based on the weight of the polyethylene in the composition, the ratio of the compatible plasticizer to the alkaline carbon black in the composition being from 0.5:1 to 1.75:1.

14. A cross-linked polyethylene composition consisting essentially of the reaction product formed upon heating a mixture of a normally solid polymer of ethylene uniformly blended with from 1 to 10 percent by weight of a quinhydrone dimeride of a 1,4-quinone and a p-disubstituted aromatic compound having at least one acidic hydrogen in each of the para substituents, and from 10 to 40 percent by weight of an alkaline carbon black having a pH, when suspended in water, in the range from about 8 to about 10, to a temperature above that at which the quinhydrone dimeride undergoes disproportionation into a free radical, all percentages being based on the weight of polyethylene in the blended mixture.

15. A cross-linked polyethylene composition consisting essentially of the reaction product formed upon heating a mixture of a normally solid polymer of ethylene uniformly blended with from 1 to 10 percent by weight of a quinhydrone dimeride of a 1,4-quinone and a p-disubstituted aromatic compound having at least one acidic hydrogen in each of the para substituents, from 10 to 40 percent by weight of an alkaline carbon black having a pH, when suspended in water, in the range from about 8 to about 10, and from 10 to 40 percent by weight of a compatable plasticizer for the polyethylene, to a temperature above that at which the quinhydrone dimeride undergoes disproportionation into a free radical, all percentages being based on the weight of polyethylene in the blended mixture, the ratio of the compatible plasticizer to the alkaline carbon black in the blended mixture being from 0.5:1 to 1.75:1.

16. A cross-linked polyethylene composition consisting essentially of the reaction product formed upon heating a mixture of a normally solid polymer of ethylene uniformly blended with from 1 to 10 percent by weight of the quinhydrone dimeride of 2,3,5,6-tetrachloro-p-benzoquinone and p-benzoquinonedioxime, from 10 to 40 percent by weight of an alkaline carbon black having a pH, when suspended in water, in the range from about 8 to about 10, and from 10 to 40 percent by weight of an elastomeric copolymer of butadiene and styrene capable of plasticizing the polyethylene, to a temperature above that at which the quinhydrone dimeride undergoes disproportionation to a 2,3,5,6-tetrachlorosemiquinone free radical, all percentages being based on the weight of the polyethylene in the blended mixture, the ratio of the elastomeric copolymer to the alkaline carbon black in the blended mixture being from 0.5:1 to 1.75:1.

No references cited.